(12) United States Patent
Costin

(10) Patent No.: US 7,345,376 B2
(45) Date of Patent: Mar. 18, 2008

(54) PASSIVELY COOLED DIRECT DRIVE WIND TURBINE

(75) Inventor: Daniel P. Costin, Chelsea, VT (US)

(73) Assignee: Distributed Energy Systems Corporation, Wallingford, CT (US)

( * ) Notice: Subject to any disclaimer, the term of this patent is extended or adjusted under 35 U.S.C. 154(b) by 4 days.

(21) Appl. No.: 11/287,959

(22) Filed: Nov. 28, 2005

(65) Prior Publication Data

US 2006/0113804 A1    Jun. 1, 2006

(51) Int. Cl.
*F03D 11/00*  (2006.01)
(52) U.S. Cl. ........................................ 290/55
(58) Field of Classification Search .................. 290/55
See application file for complete search history.

(56) References Cited

U.S. PATENT DOCUMENTS 4,613,279 A * 9/1986 Corren et al. ............ 415/121.2
4,840,222 A * 6/1989 Lakin et al. .................. 165/47
5,331,238 A * 7/1994 Johnsen ........................ 310/58
7,033,139 B2 * 4/2006 Wobben ...................... 415/178
2003/0141721 A1   7/2003 Bartlett ........................ 290/55
2004/0179934 A1   9/2004 Wobben ...................... 415/41
2006/0001269 A1   1/2006 Jansen et al. .................. 290/44

FOREIGN PATENT DOCUMENTS

FR         2838252 A1 * 10/2003
JP         09261915 A  * 10/1997
WO     WO 9740569 A1 * 10/1997

* cited by examiner

*Primary Examiner*—Joseph Waks
(74) *Attorney, Agent, or Firm*—Cantor Colburn, LLP

(57) ABSTRACT

A wind turbine is provided that passively cools an electrical generator. The wind turbine includes a plurality of fins arranged peripherally around a generator house. Each of the fins being oriented at an angle greater than zero degrees to allow parallel flow of air over the fin. The fin is further tapered to allow a constant portion of the fin to extend beyond the air stream boundary layer. Turbulence initiators on the nose cone further enhance heat transfer at the fins.

8 Claims, 7 Drawing Sheets

PASSIVELY COOLED DIRECT DRIVE WIND TURBINE

FEDERAL RESEARCH STATEMENT

This invention was made with Government support under contract DE-FC36-03GO13131 awarded by the Department of Energy. The Government has certain rights in this invention.

FIELD OF INVENTION

This disclosure relates generally to wind turbine and especially to wind turbines wherein the electrical generator is passively cooled.

BACKGROUND OF THE INVENTION

The wind has historically been one of the most widely used natural resources to provide the energy necessary to power our needs. As the demand for energy has increased and the supplies of fossil dwindled, resulting there has been a renewed look by electrical utility companies at alternative methods for producing electrical power. One method of electrical production involves the harnessing of the wind by a wind turbine to drive an electrical generator.

Wind turbines typically involve using a series of blades fixed to the top of a tower to rotate about a horizontal axis. The blades have an aerodynamic shape such that when a wind blows across the surface of the blade, a lift force is generated causing the series of blade to rotate a shaft about an axis. The shaft is connected, typically via a gearing arrangement, to an electrical generator located in a structure called a nacelle which is positioned behind the blades.—[No gearbox on this design]

The nacelle houses a number of components which are needed in modern high capacity wind turbines. In addition to the aforementioned generator, other components include a yaw drive which rotates the wind turbine, various controllers, and a brake that is used to slow the generator. Since it is desirable to keep the nacelle as small as possible, and given the number of relatively large pieces of equipment which must be located in the nacelle, space becomes very valuable. This often results in difficulties in both manufacturing the wind turbine and in conducting maintenance operations in the nacelle once the wind turbine is installed.

Typically, the nacelle will also incorporate a system for cooling components, especially the electrical generator. These cooling systems usually utilize some type of active cooling, such as cooling water or fans. Alternatively, some wind turbines have directed cooling air for circulation within the generator housing and nacelle. Each of these methods of cooling result has resulted in disadvantages, i.e. a lower efficiency or acoustical issues.

Accordingly, it is considered desirable to provide a wind turbine which provides a passive means for cooling the wind turbine generator.

SUMMARY OF THE INVENTION

A wind turbine is provided that passively cools an electrical generator. The wind turbine includes a plurality of fins arranged peripherally around a generator housing. Each of the fins being oriented at an angle greater than zero degrees to allow parallel flow of air over the fin. The fin is further tapered to allow a constant portion of the fin to extend beyond the air stream boundary layer.

A wind turbine is provided that includes a method for cooling an electrical generator. The method includes rotating a plurality of wind turbine blades in a free wind velocity, creating a swirl wind stream having a velocity orientated at greater than zero degrees from the free wind velocity. Moving the swirl wind stream across the length of a protrusion where the protrusion is oriented such that the length is parallel to the swirl wind stream velocity. Transferring heat from said protrusion to said swirl wind stream.

Further improvements are provided by incorporation of turbulence initiators on the nose cone, which can be in the form of bumps, dents, or fins. The increased turbulence in the air stream enhances heat transfer in the fins, and increases the speed of airflow in the region close to the generator.

The above discussed and other features will be appreciated and understood by those skilled in the art from the following detailed description and drawings.

BRIEF DESCRIPTION OF THE DRAWINGS

Referring now to the drawings, which are meant to be exemplary and not limiting, and wherein like elements are numbered alike.

DESCRIPTION OF PREFERRED EMBODIMENT

Electrical power may be generated by many different methods. The most common methods involve the boiling of water using fossil or nuclear based fuels. The steam produced by the boiling is used to rotate a turbine that drives an electrical generator to create the electrical power. While these common methods are very efficient, they also have undesirable side effects, such as the production of toxic pollutants, or the rely on a dwindling natural resource. One alternate method of creating electrical power is to harness a renewable natural resource such as the wind to be a driving force to rotate the electrical generator to produce the electricity.

Figure 1A:
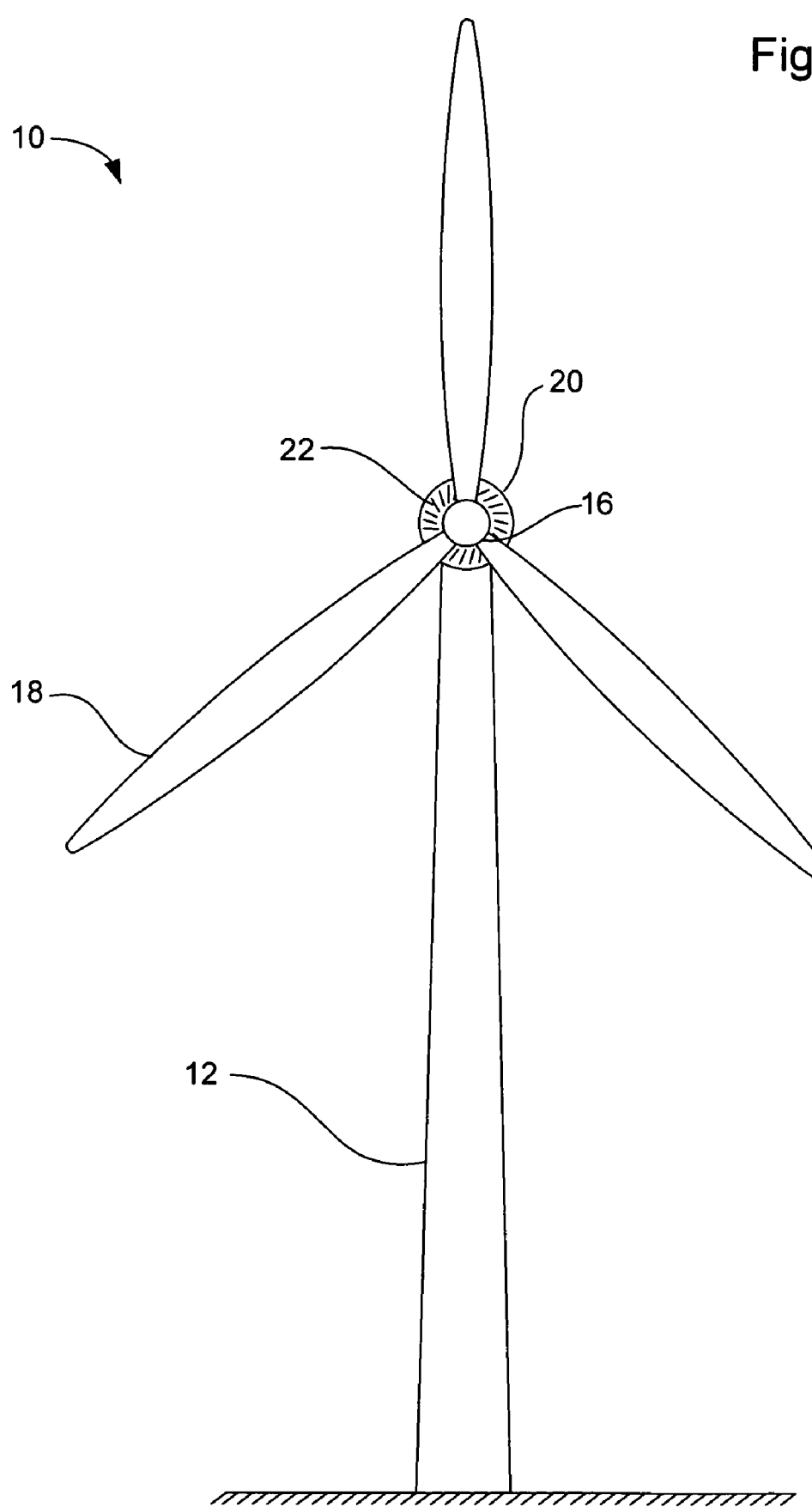
FIG. 1 is a plan view illustrating a direct drive wind turbine of the present invention.
Figure 1B:
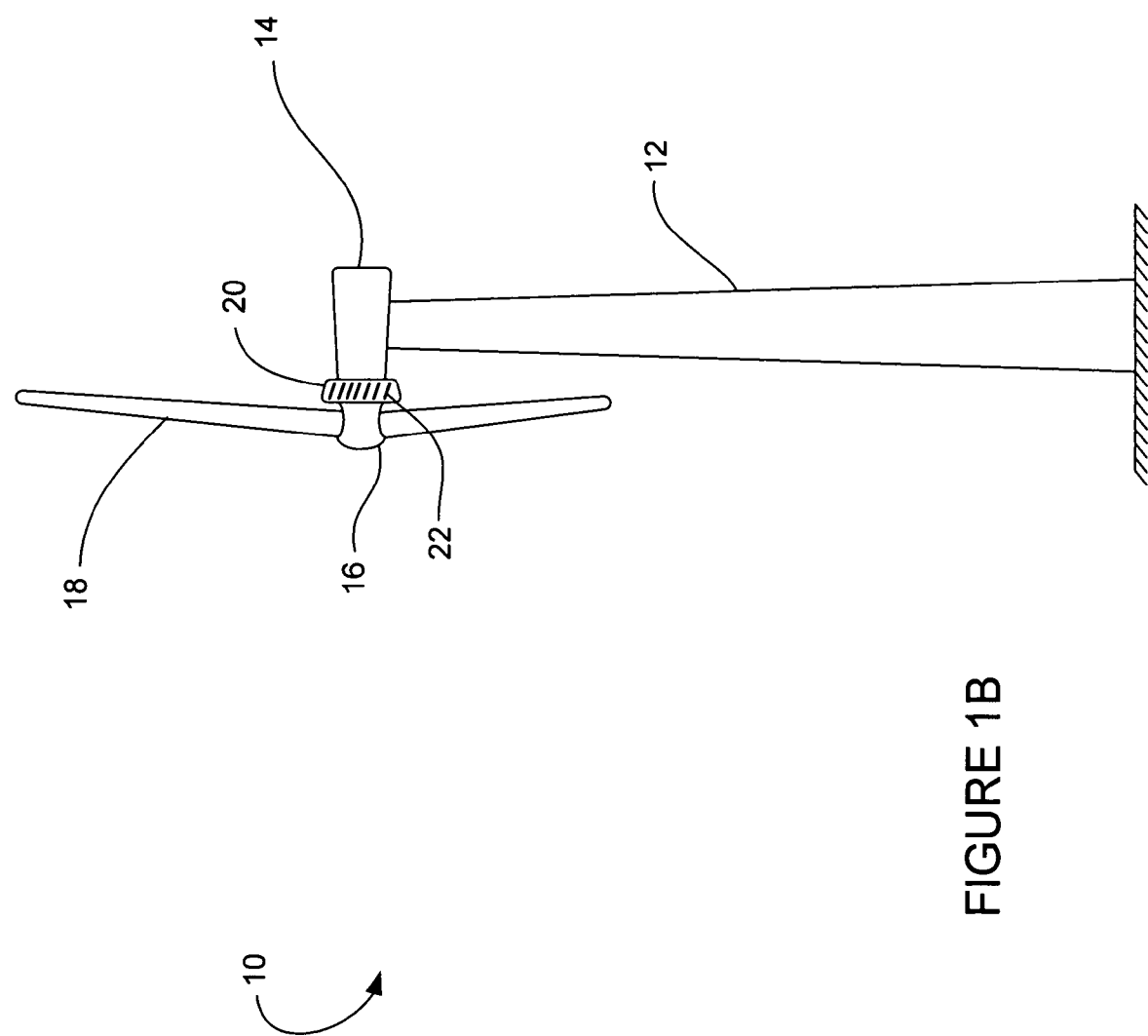
Figure 2:
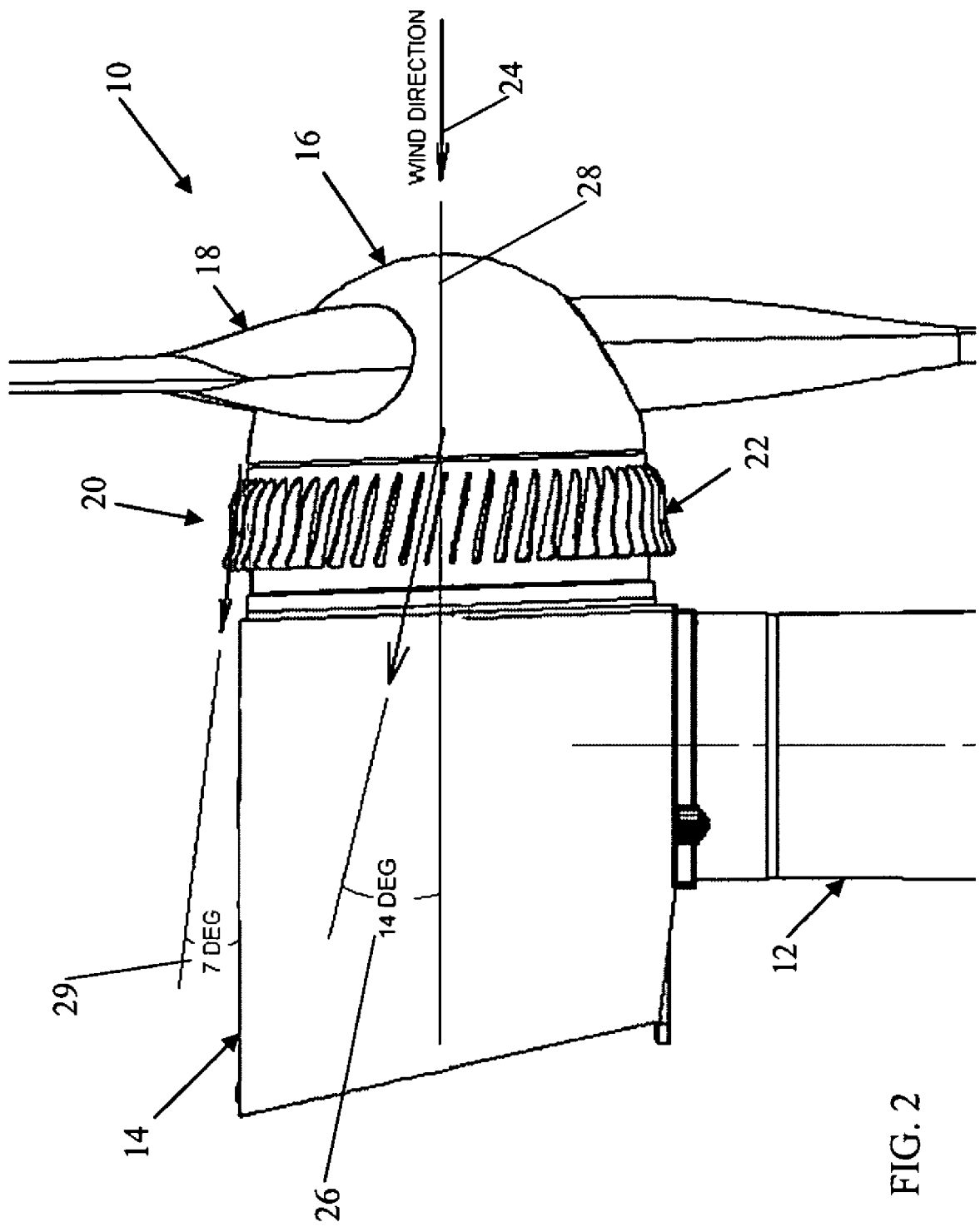
FIG. 2 is a side plan view of the wind turbine of FIG. 1.

Referring to FIG. 1 and FIG. 2, a wind turbine 10 capable of generating electrical power in the 100 kw to 2000 kW range is shown. The wind turbine 10 is includes a tower 12 which is anchored to the ground by means of a bolted connection to a steel and concrete foundation. On the opposing end of the tower 12, the nacelle 14 is mounted to rotate about the tower 12 to allow the nose cone 16 and the plurality of blades 18 to face into the wind. A plurality of fins 22 are disposed on a generator housing 20 within which an electrical generator is positioned. As will be described in more detail herein, the plurality of fins 22 provide a cooling surface to conduct heat away from the generator 20.

Typically for this size turbine, the tower 12 is between 20 and 100 meters in height and constructed of tapered tubular steel of up to 4 meter diameter at the ground and 1-2 meter diameter at the top. The tapered tubular steel tower is constructed in sections to facilitate the transportation and assembly of the wind turbine 10 at its point of use. Alternatively, the tower may be made from a lattice structure or from concrete sections. In the preferred embodiment, there are three turbine blades 18 of 10 to 45 meters in length that equally spaced around the nose cone 16. While the blades may be made of any suitable material, typically a glass fiber reinforced plastic or epoxy is used to reduce weight while still providing the necessary mechanical strength required to withstand the wind loads. To reduce the complexity of the wind turbine 10 the blades 18 are preferably of a fixed pitch type, though variable pitch blades could also be used as well.

Figure 6A:
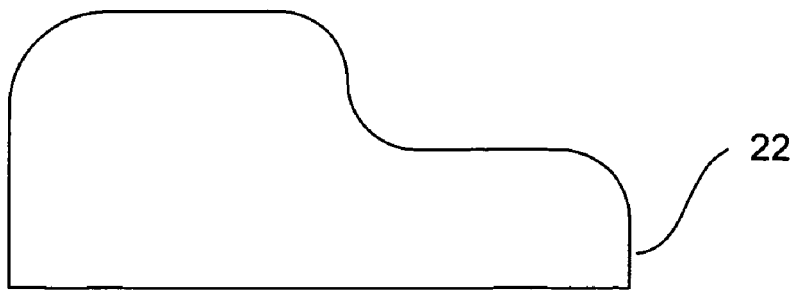
FIG. 6*a*-6*c* is a side plan view of alternate embodiment fin profiles of the wind turbine in FIG. 1.
Figure 6B:
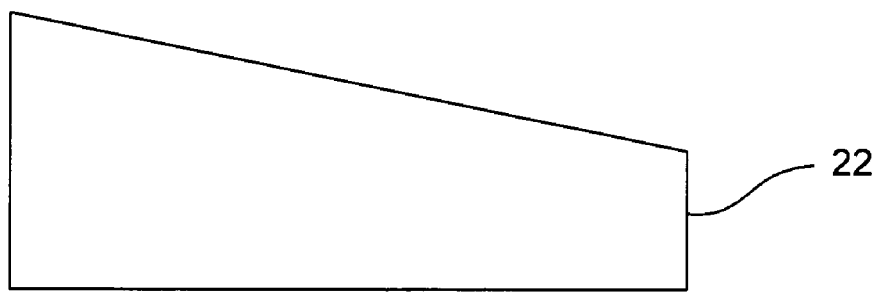
Figure 6C:

Turning to FIG. 2, the generator housing 20 will be described in more detail. The generator housing 20 contains an electrical generator (not shown) that is connected directly to the nose cone 16 and the blades 18. A plurality of fins 22 are arranged circumferentially about the housing 20. Referring to FIG. 6a, 6b, 6c, the fins 22 may have a number of different profile shapes. As will be made clearer herein, the profile height H, should be of sufficient length to allow at least a portion of the fin 22 to extend beyond the boundary layer of the air moving past the housing 20. The boundary layer herein is described as the slow moving air layer close to the generator and inside the rapidly moving air of the free stream.

Each of the fins 22 is inclined in two directions. With respect to the wind direction 24, each fin 22 is oriented or pitched at an angle 26 to compensate for air swirl created by the rotation of the blades 18. In the preferred embodiment, this angle 26 will be greater than zero degrees and less than 30 degrees, and more preferably the angle will be 15 degrees. When viewed relative to the centerline 28 of the wind turbine 10, the fins 22 are also tapered 29 along the length of the fin 22. The tapering is preferred to allow the fin 22 to maintain a constant portion of the fin 22 surface in the more rapidly moving air located beyond the boundary layer (not shown). In the preferred embodiment, the fin 22 will taper at an angle of between 4 to 10 degrees with respect to the centerline 28 depending on the turbulence of the air stream. More preferably taper angle will be 7 degrees.

The electrical generator within the housing 20 is similar to that described in U.S. patent application Ser. No. 10/709,176 entitled "Direct Drive Wind Turbine" filed on Apr. 19, 2004 which is incorporated by reference herein. The electrical generator is comprised of two main components: a rotor that is operated by the rotation of the turbine blades 18; and a stator which is positioned adjacent to, or mounted on the housing 20. During operation, the electrical generator generates heat that needs to be dissipated to prevent degradation of the components and performance of the electrical generator. Due to the swirl in the air flow created by the rotation of the blades, the air behind the blades 18 is angled in the direction of the blade 18 direction with respect to the original free stream wind 24. It has been estimated that the resulting component of the wind speed in the direction parallel to the centerline 28 is as little as 25% of the free stream wind velocity. By positioning the fins 22 in an orientation that is parallel to the resultant swirled or angled air flow, i.e. at the angle 26, the effect of shadowing, meaning one fin blocking the air of another fin, is eliminated. By eliminating the shadow effect, the air velocity over the fins 22 increases which corresponds to an increase in the effectiveness the heat transfer from the electrical generator through the fins 22. In the preferred embodiment, the angle will be such that the velocity of the swirled air flow over the fins 22 will approach the free stream wind velocity. For example, in the preferred embodiment, the increase in effectiveness allows the total number of fins 22 required to adequately cool the electrical generator to be reduced from 99 (zero degree fin angle) to 55 (14 degree fin angle).

Figure 3:
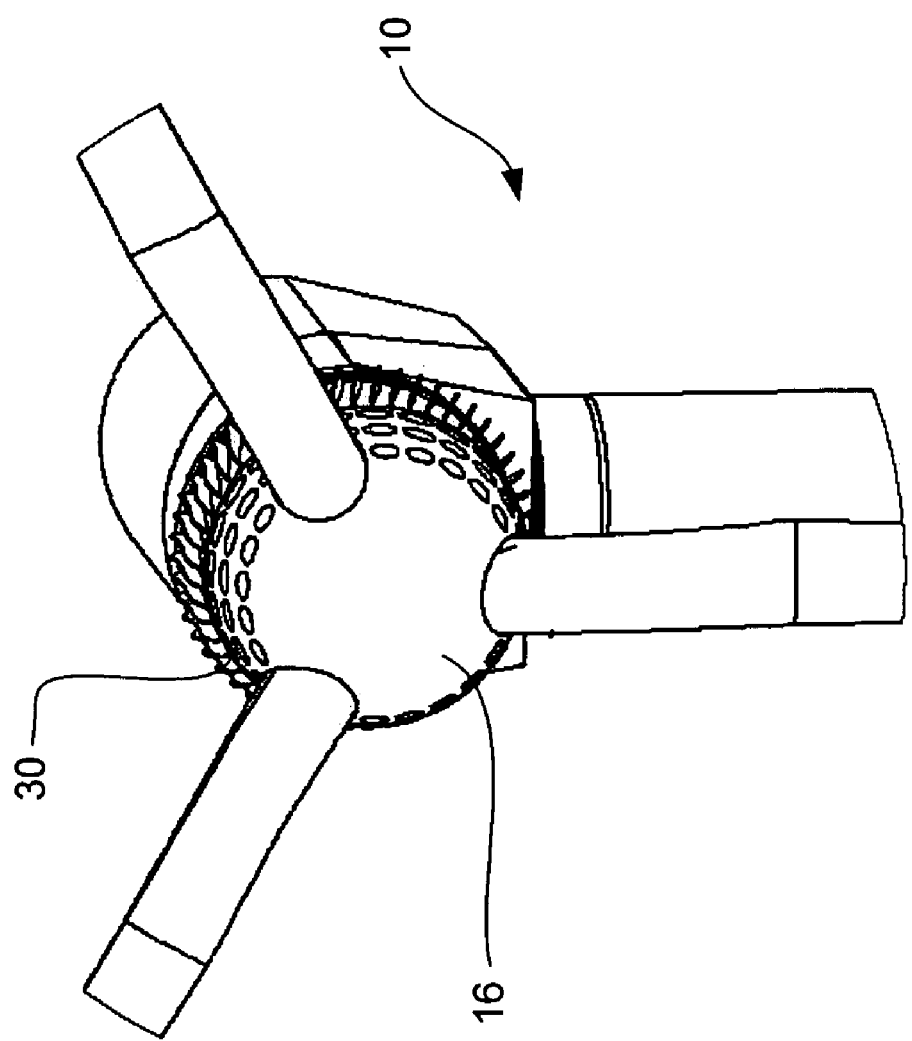
FIG. 3 is a perspective view of an alternate embodiment wind turbine incorporating turbulence initiators.
Figure 4:
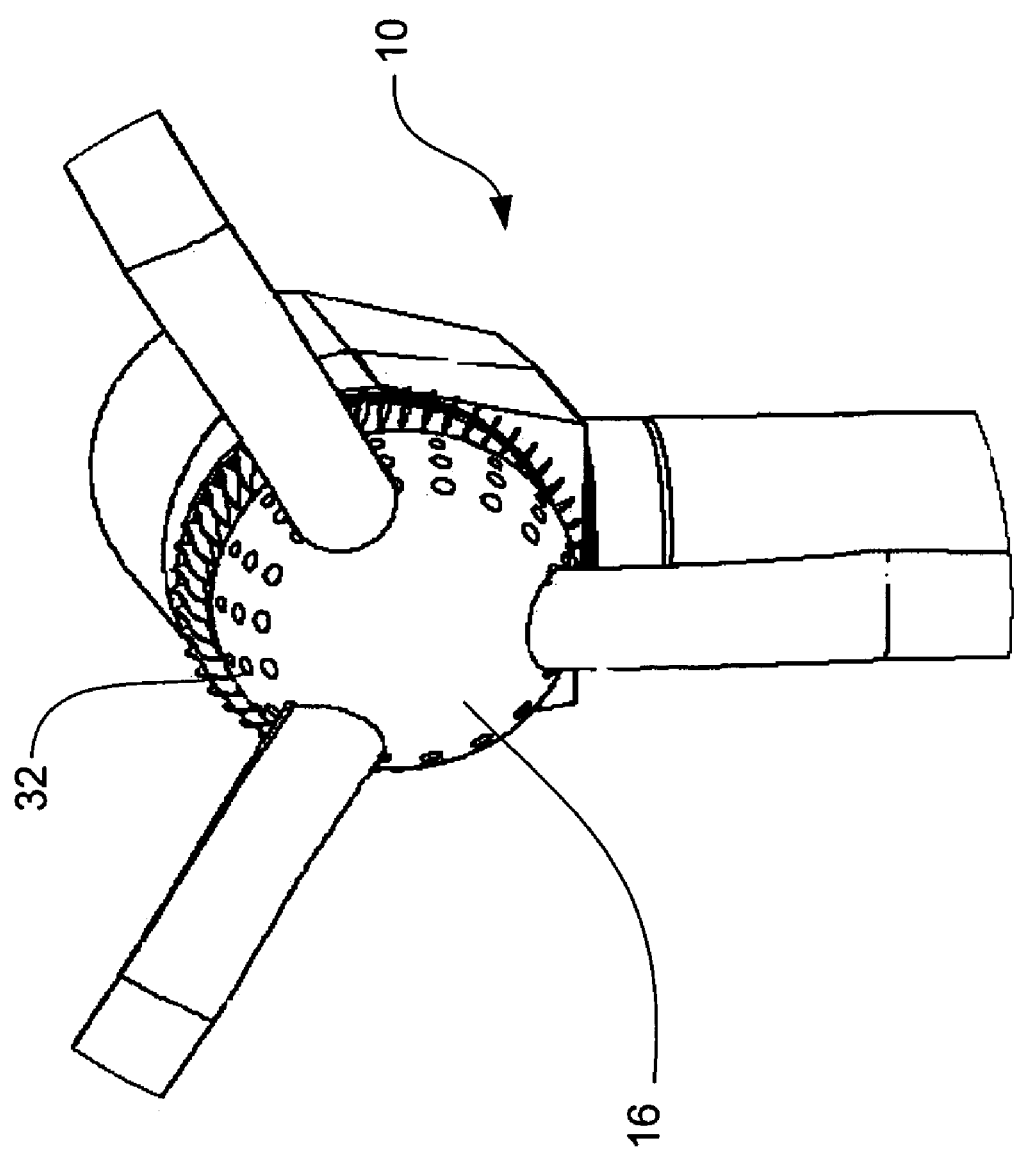
FIG. 4 is a perspective view of another alternate embodiment wind turbine incorporating turbulence initiators.
Figure 5:
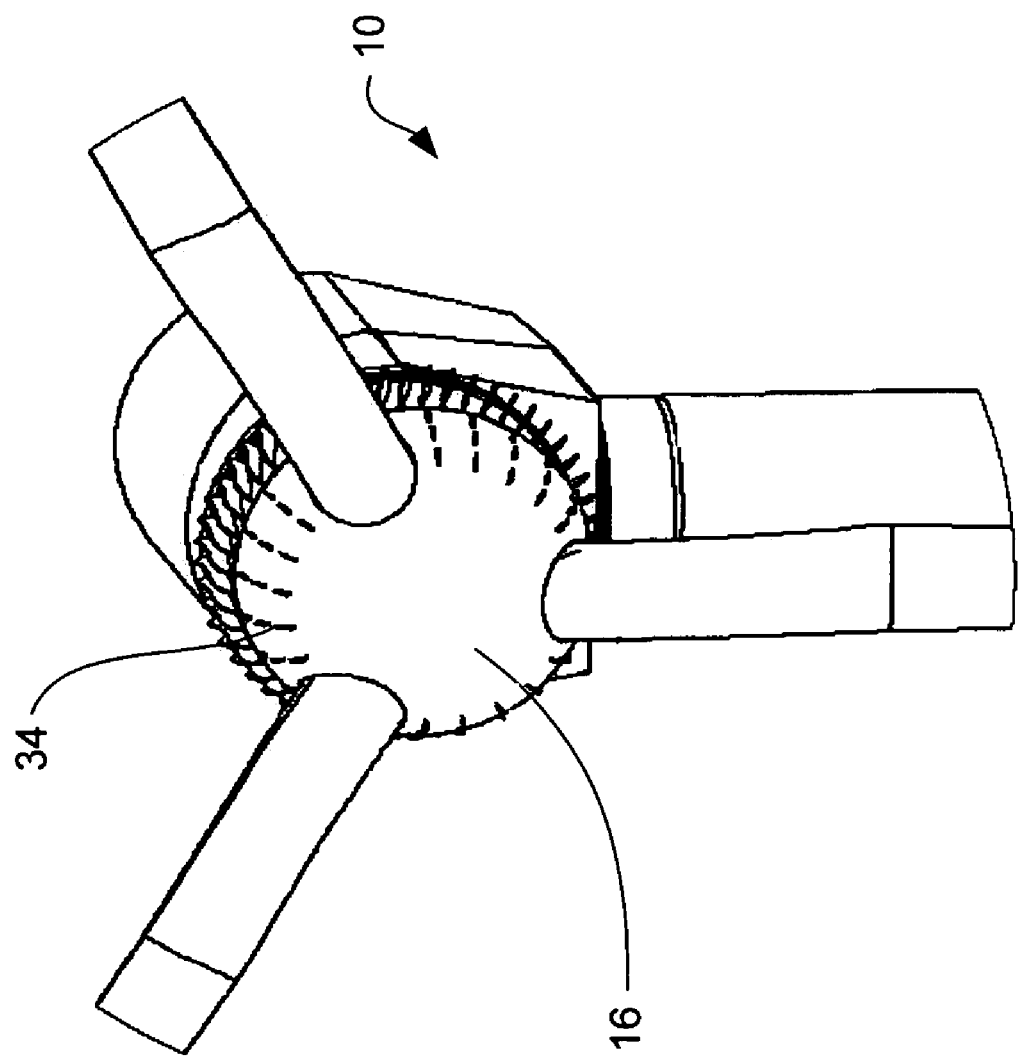
FIG. 5 is a perspective view of another alternate embodiment wind turbine incorporating turbulence initiators.

Referring now to FIGS. 3-5, an alternate embodiment wind turbine is shown. Each of these embodiments uses a turbulence initiator 30, 32, 34 on the nose cone adjacent to and down wind from the blades 18. These turbulence initiators 30, 32, 34, initiate turbulent airflow adjacent to the surface of the nosecone 16. Since turbulent airflow tends to delay flow separation from the surface and reduces pressure drag, the resulting boundary layer near the fins 22 will be thinner than a wind turbine 10 without turbulence initiators. A thinner boundary layer results in smaller and more cost effective fins 22. Additionally, a turbulent air stream increases heat transfer from the fin to the air. The turbulence generators 30, 32, 34 may take any suitable geometric form such as a dimple or recess 30, a bump or protrusion 32 or a small fin 34.

While the invention has been described with reference to a preferred embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A wind turbine for operation in an environment having a free wind velocity comprising:
   a nacelle;
   a plurality of turbine blades;
   a generator adjacent said nacelle and coupled to said plurality of turbine blades, said generator including a stationary housing;
   a nosecone coupled to said generator opposite said nacelle wherein said turbine blades are coupled to said nosecone;
   a plurality of protrusions extending from said housing, said protrusions having a length associated therewith and extending peripherally around said housing, wherein said protrusions are being oriented on said housing at an angle greater than zero degrees with respect to said free wind velocity; and,
   a plurality of turbulence initiators arranged around said nosecone.

2. The wind turbine for operation in an environment have a free wind velocity of claim 1 wherein said plurality of turbulence initiators is selected from a group comprising a dimple, a recess, a protrusion, or a fin.

3. A method for cooling a wind turbine generator comprising the steps of:
   rotating a plurality of wind turbine blades in a free wind velocity;
   creating a swirl wind stream having a velocity orientated at greater than zero degrees from the free wind velocity;

moving said swirl wind stream across a protrusion having an associated length, said protrusion being oriented such that said length is parallel to said swirl wind stream velocity; and, transferring heat from said protrusion to said swirl wind stream.

4. The method for cooling a wind turbine generator of claim 3 further comprising the step of rotating an electrical generator with said plurality of wind turbine blades.

5. The method for cooling a wind turbine generator of claim 4 further comprising the step of generating heat from said generator.

6. The method for cooling a wind turbine generator of claim 5 further comprising the step of transferring said generator heat to said protrusion.

7. The method for cooling a wind turbine generator of claim 6 wherein said swirl wind stream velocity orientation is between 0 and 14 degrees.

8. The method for cooling a wind turbine generator of claim 3 further comprising the step of transferring said generator heat through said protrusions.

* * * * *